(12) United States Patent
Hunt et al.

(10) Patent No.: US 10,523,421 B2
(45) Date of Patent: Dec. 31, 2019

(54) CHECKPOINTS FOR PERMISSIONLESS BLOCKCHAINS

(71) Applicant: International Business Machines Corporation, Armonk, NY (US)

(72) Inventors: Guerney D. H. Hunt, Yorktown Heights, NY (US); Lawrence Koved, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/632,522

(22) Filed: Jun. 26, 2017

(65) Prior Publication Data

US 2018/0152289 A1    May 31, 2018

Related U.S. Application Data

(63) Continuation-in-part of application No. 15/422,980, filed on Feb. 2, 2017, which is a continuation of application No. 15/364,363, filed on Nov. 30, 2016.

(51) Int. Cl.
| | |
|---|---|
| *H04L 29/06* | (2006.01) |
| *H04L 9/06* | (2006.01) |
| *H04L 9/32* | (2006.01) |
| *G06Q 40/00* | (2012.01) |
| *G06Q 20/22* | (2012.01) |

(52) U.S. Cl.
CPC ......... *H04L 9/0637* (2013.01); *G06Q 20/223* (2013.01); *G06Q 40/12* (2013.12); *H04L 9/0643* (2013.01); *H04L 9/3236* (2013.01); *H04L 9/3247* (2013.01); *H04L 9/3263* (2013.01); *G06Q 2220/00* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 7,305,450 B2 | 12/2007 | Rescorla et al. | |
| 7,979,626 B2 | 7/2011 | Rogers et al. | |
| 9,875,510 B1 * | 1/2018 | Kasper | G06Q 40/12 |

(Continued)

*Primary Examiner* — Malcolm Cribbs
(74) *Attorney, Agent, or Firm* — Jeffrey S. LaBaw; David H. Judson

(57) ABSTRACT

A certified checkpoint is provided for a ledger comprising a blockchain and a world state. The certified checkpoint enables a third party to recognize and verify that the ledger has integrity, a known starting state, and immutability properties starting at a specific point in time. Certification means that all of the validating peers reached consensus on the state of the ledger at that point in time. Thus, the certified checkpoint state represents an agreed-upon state, and that one or more subsequent operations on the ledger are relative to that agreed-upon state. Preferably, before a checkpoint is certified, it must be consistent, meaning that all validating peers have reached the same value for the checkpoint. Preferably, the checkpoint is a compression of the current blockchain world state into a compact representation (e.g., a hash) of the ledger that based on an agreed-upon consensus protocol is consistent across the (validating) peers. The approach also is extended to a permissionless blockchain.

21 Claims, 12 Drawing Sheets

(56) References Cited

U.S. PATENT DOCUMENTS

| | | | |
|---|---|---|---|
| 2010/0235606 A1* | 9/2010 | Oreland | G06F 16/2255 |
| | | | 711/173 |
| 2016/0085955 A1* | 3/2016 | Lerner | G06F 21/31 |
| | | | 726/20 |
| 2016/0134593 A1* | 5/2016 | Gvili | H04L 63/0428 |
| | | | 713/170 |
| 2017/0116693 A1* | 4/2017 | Rae | G06F 21/64 |
| 2017/0323392 A1* | 11/2017 | Kasper | G06Q 40/12 |
| 2017/0344987 A1* | 11/2017 | Davis | H04L 63/06 |
| 2018/0117447 A1* | 5/2018 | Tran | A63B 71/145 |
| 2018/0158054 A1* | 6/2018 | Ardashev | G06Q 20/389 |
| 2018/0165758 A1* | 6/2018 | Saxena | G06Q 40/00 |
| 2018/0253702 A1* | 9/2018 | Dowding | G06Q 20/06 |
| 2018/0285971 A1* | 10/2018 | Rosenoer | G06N 20/00 |
| 2018/0341930 A1* | 11/2018 | Moir | G06Q 20/0655 |

\* cited by examiner

CHECKPOINTS FOR PERMISSIONLESS BLOCKCHAINS

BACKGROUND

Technical Field

This disclosure relates generally to transaction processing using highly-scalable, decentralized peer-to-peer (P2P) networks, known as blockchains.

Background of the Related Art

Blockchain is a type of business transaction ledger. A blockchain network is a decentralized system for the exchange of assets. It uses a shared ledger (that is either public or private) for recording the history of electronic business transactions that take place in a peer-to-peer (P2P) business network. A blockchain network uses a decentralized consensus mechanism or protocol. In particular, all validating nodes in the network run the same (agreed-upon) consensus algorithm against the same transactions, and thus validate (or invalidate) each transaction. Valid transactions update the ledger. A blockchain peer-to-peer network is resilient given its decentralized topology. As member nodes join or leave the network dynamically, messages are exchanged between the network participants on a best-effort broadcast basis.

A blockchain is a permanent digitized chain of transactions, grouped into blocks, that ensures that participants cannot tamper with or deny past transactions. A permissioned blockchain is one in which the participants who invoke business transactions, as well as those who control and manage copies of the blockchain, are known. To this end, an identity service in a permissioned blockchain typically links information about business entities to the cryptographic keys used to digitally sign transactions. Typically, a ledger comprises a blockchain, and an associated world state. The world state typically is a view, but can be a superset, of the blockchain that comprises a set of referenceable variables that, while necessarily recorded in the blockchain, can be utilized by programs running on the network. In particular, to update the ledger with a proposed transaction, each node must process the transaction against the logic of one or more programs running directly on the replicated network. These programs, called chaincode, are replicated across each node in the network to guarantee uptime and functionality. Chaincode is stored on the blockchain and triggered by transaction requests.

Hyperledger is a cross-industry collaborative effort to support permissioned blockchain-based distributed ledgers. It is focused on ledgers designed to support global business transactions, including major technological, financial, and supply chain companies, with the goal of improving many aspects of performance and reliability. The project aims to bring together a number of independent efforts to develop open protocols and standards by providing a modular framework that supports different components for different uses. A Hyperledger is a peer-to-peer distributed network that uses cryptographic security, decentralized consensus, and a shared public ledger with properly-controlled and permissioned visibility.

To bring new validating peers into a blockchain network, such as a permissioned blockchain like Hyperledger, it is necessary to transmit the blockchain state from one or more of the network peers to the new peer. Long-lived blockchains will contain an extremely large number of blocks and world state. It is both inefficient, and impractical, to transmit tens or hundreds of gigabytes, if not terabytes, to the new peers in the network simply to enable these new peer nodes to participate in the network. To support the efficient and rapid addition of new validating (and non-validating) peer nodes in a blockchain network, there needs to be an efficient mechanism for identifying the current state of the blockchain so it can be efficiently communicated to the new peer nodes, and enable them to start participating in the network.

In addition, many types of businesses, including finance, have auditing requirements that are built on the premise that the audit will be conducted over an interval of time—from a start date to an end date. It is assumed that the state of the ledger (e.g., a financial ledger) is consistent and acceptable prior to the starting date and that the transactions from that date until the ending date are to be audited. Earlier data may be available for reference purposes, but it may not be required. As such, it be desirable to provide a way to record of the state of the system at the starting point of the audit interval and perhaps at the end of the interval as well.

Many kinds of blockchains applications are currently under discussion and their design are intended to be very long-lived (e.g., even up to 50 years or more). For long-lived blockchain ledgers, typically there are requirements for pruning the ledger for practical or regulatory reasons. In the absence of any application-specific audit checkpoint logic, to perform an audit using the current Hyperledger design, the auditor will need to start with the ledger's genesis (first) block and run all (relevant) transactions forward through time to reach the start of the audit period, and then continue running all of the relevant transactions for the current audit period. If the ledger contains substantial history (5 years, 10 years, or longer, with millions or billions of transactions), this process of processing the transactions to reach the start of the audit period can require a substantial amount of computational resources. Thus, it would be highly desirable to find a way to forestall this lengthy and resource-intensive process.

In financial and other business scenarios, old data prior to specific points in time are no longer relevant and can be discarded. Some businesses have record retention policies. Data older than a particular date is to be discarded. For privacy and legal reasons, old data is to be discarded. For Internet of Things (IoT)-based applications, many desired use cases have limited storage capacity, and thus pruning is essential. In such scenarios, bringing a new permissioned blockchain validating peer online requires transfer of the ledger (blockchain, world state) to the new peer, and efficiently enabling this operation may be critical.

BRIEF SUMMARY

According to a first aspect, a certified checkpoint is provided for a ledger comprising a blockchain and a world state. The certified checkpoint enables a third party (e.g., an independent auditor, or others) to recognize and verify that the ledger has integrity, a known starting state, and immutability properties starting at a specific point in time that represents the checkpoint. The checkpoint is certified, which means that all of the validating peers reached consensus on the state of the ledger at that point in time. Thus, the certified checkpoint state represents an agreed-upon state, and that one or more subsequent operations on the ledger are relative to that agreed-upon state.

In the approach herein for a permissioned blockchain, before a checkpoint is certified, it must be consistent, meaning that all validating peers must reach the same state (value) for the checkpoint. Preferably, the checkpoint is a compression of the current blockchain world state into a compact representation (e.g., a hash value) of the ledger that is consistent across the (validating) peers. Agreement on what it means to be consistent is based on an agreed-upon consensus protocol. In the preferred approach, a checkpoint is done between two blocks in the blockchain, namely, after consensus has been reached on block n but before consensus is started for block n+1. A blockchain consensus algorithm used for this purpose itself has distributed agreement (where agreement is reached by any mechanism prior to the checkpoint) on where the checkpoint will be done. Once checkpoint processing has begun, no changes are allowed to the world state or blockchain until consensus is reached on the checkpoint state. During the checkpoint process, the world state is written to storage, and a hash of the world state checkpoint is taken computed. A consensus on the hash of the world state checkpoint is then reached. Preferably, the world state checkpoint hash is then entered as a transaction in a next block in the blockchain, preferably along with the hash of the prior block. Optionally, the location of the checkpoint state (e.g., world state) is included as part of this transaction.

According to another aspect of this disclosure, a technique to certify a blockchain checkpoint for a permissioned blockchain is described. To have a certifiably-auditable blockchain, an auditor should be able to rerun the transactions between checkpoints and then compare the value of the latter checkpoint with the value recorded in the ledger. The first step in this auditing process is to double check the hashes of all the blocks in the chain. To be thorough, the signatures on all transactions should be checked, although the hashes on all blocks ought to be sufficient. Note that the signatures may verify, but the certificates associated with the signatures may have expired. As such, checking the date for validity periods is also required to ensure that the signatures were performed during the certificate validity period. Preferably, a blockchain checkpoint certification should be done by an independent party. Those operating the blockchain preferably have an agreed-upon policy amongst the validating peers stating the number of agreeing parties and signatures to certify the checkpoint. These certification parties are sometimes referred to herein as blockchain checkpoint auditors.

Preferably, certification starts from the genesis block or the previously certified checkpoint (the last checkpoint that has been certified before the checkpoint being certified). The process begins by retrieving the world state associated with the starting point (prior checkpoint or genesis block), and then validating the hash of the world state. Starting with the first block after the previous checkpoint (or genesis block), the hashes (and optionally, the signatures as well) are validated. Then, all transactions are executed against the version of the world state, proceeding by processing all transactions in each block, block-by-block, until the target (e.g., next) checkpoint has been reached. This process creates an updated checkpoint world state. The hash of the updated checkpoint world is computed and compared to the hash of the current checkpoint. If the hashes match, the auditor can certify that the checkpoint is valid, and it does so preferably by entering the certification (as a transaction) in the next block to be written to the blockchain. The certification transaction should indicate (or point to) the checkpoint that was certified. If the audit is not done immediately, the attestation can show up in a later block. In an alternative embodiment, multiple auditors can validate a checkpoint and run a consensus algorithm on the hash of the checkpoint to be certified. In either case, the result of the audit may be recorded as a transaction in the blockchain, e.g., "checkpoint consensus, checkpoint location (e.g., block number(s)), date, time, checkpoint hash."

According to a further feature of this disclosure, a method of checkpointing a permissionless blockchain is described. In a permissionless blockchain, there are entities, often referred to as miners, which are systems that can extend the blockchain. In some embodiments, miners compete to solve a hard problem. The first miner to solve the problem is permitted to extend the chain and start working on generating the next blockchain block. In this operating scenario, however, those systems extending the chain do not normally communicate directly with one another. To address this, checkpointing may be carried out by a subset of the computing entities that are acting as the miners. In particular, a first consensus among the subset of the miners indicates consensus (among the subset) that a checkpoint between two stable blocks in the permissionless blockchain is to be taken. Instead of saving a world state associated with the blockchain (as in the permissioned embodiment), a world state associated with the first of the two stable blocks is recreated and then saved. Then the hash of the saved world state (associated with the first of the two stable blocks) is generated. A second consensus among the subset of the miners indicates consensus that each of them has generated the hash, such that the same world state associated with the first of the two stable blocks has been saved (once again, by each of the miners). The saved world state associated with the first of the two stable blocks is then provided as a certified checkpoint for the permissionless blockchain. Because the two stable blocks cannot be changed, information about the checkpoint is recorded in a future block.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
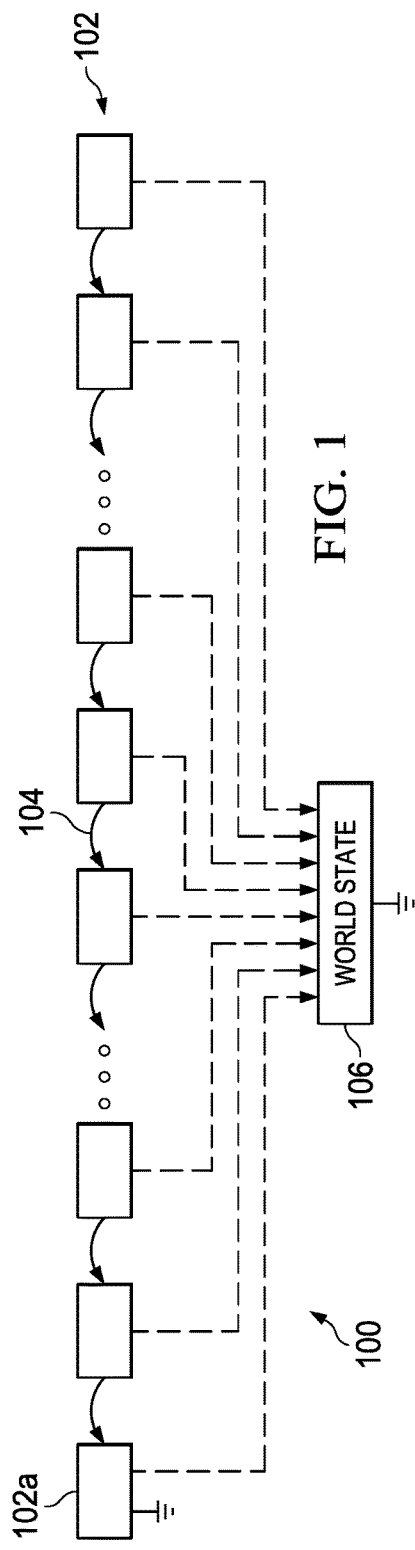
FIG. 1 depicts an exemplary permissioned blockchain structure.

Referring now to FIG. 1, a blockchain 100 is depicted by blocks 102, with each block pointing back to a previous block. The pointer 104 is a hash of the previous block. Depending on how the chain 100 is stored, a record containing the hash may contain the address or other information that makes identifying the previous blocks simpler. The leftmost block 102a represents a genesis (first) block of the blockchain 100. The world state 106 is empty at the genesis block, and it is progressively filled as the blockchain proceeds to incorporate additional transactions. Transactions, as recorded in the blocks, modify the world state. Although not depicted, the blockchain may support sub-chains (also known as sub-ledgers), in which case the approaches described herein apply independently to each sub-chain.

The blockchain "state" comprises the world state 106 and the blockchain 100. The world state is a current state of stored variables (e.g., a ledger view, typically instantiated in a key/value store), and the blockchain itself, which is the linked blocks of transactions with secure hashes representing the transactions that were successful or unsuccessful. As will be described in detail below, the process of creating a certified checkpoint begins by reaching agreement on the point (e.g., block number) at which to compute and certify the checkpoint. The checkpoint is performed between two blocks in the blockchain. Once checkpoint processing has begun, no changes are permitted to the state (world state, blockchain) until consensus is reached on the checkpoint state. The checkpointed world state is written or otherwise saved. As will be described below, preferably there are multiple possible representations of the world state. A hash of the world state checkpoint is then computed by each validating peer. A consensus on the hash of the world state checkpoint is reached. In particular, the validating peers reach consensus on the checkpoint state, or an auditor (oracle) declares the hash of the checkpoint world state. This world state checkpoint hash is then entered as a transaction in a next block in the blockchain. In particular, a signature of the peers that agreed on the checkpoint state is entered, or a signature of an auditor (oracle) that "certifies" the correctness of the checkpoint is entered.

As described, there are several possible representations of the world state. These include, for example: a full world state representation, a delta-based world state representation, or a mixed representation world state. In an alternative embodiment, the world state may be a logical view into the blockchain, where the world state is a key/value store abstraction. In such an embodiment, the world state is implemented as a set of keys with associated references to the actual data (values) in the blockchain blocks.

In a full world state representation, garbage collection can be performed, e.g., by keeping all variables (key/value pairs) that are nominally referenced by an active chaincode or are globally accessible, by removing all variables (key/value pairs) that are no longer referenced by an active chaincode and are not globally accessible, and by compressing the storage to remove the unused variables. After garbage collection is performed, the world state checkpoint is marked as a "full" (not a delta) checkpoint. It is then saved, and its hash computed, and the hash is used to reach consensus on the checkpoint.

In a delta-based world state representation, each checkpoint of the world state holds only those variables (key/value pairs) that have changed since the previous checkpoint. In this approach garbage collection also is performed as described, and a reference to the previous delta or full world state checkpoint may be included. During checkpoint processing, the most recent key/value pairs of the variables since the last delta (or full checkpoint) was performed on the world state are recorded, and an indication is provided that this world sate is a "delta" (not a full) checkpoint. The hash of the preceding delta, or full, world state checkpoint is also included in the representation. The checkpointed delta world state is saved. Its hash is then computed, and it is used to reach consensus on the checkpoint.

The above two methods can be combined to have occasional full checkpoints and delta checkpoints between the full checkpoints. This is the mixed world state checkpoint representation.

Figure 2:
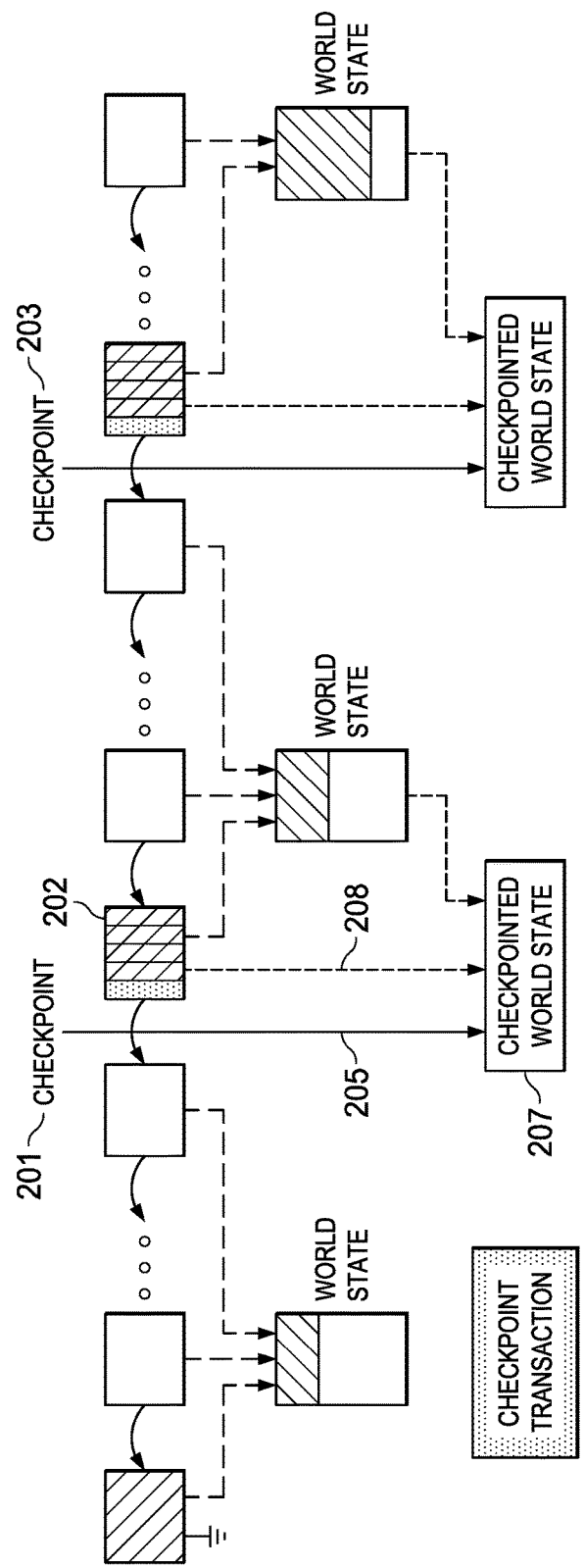
FIG. 2 depicts a full checkpoint on the permissioned blockchain.
Figure 3:
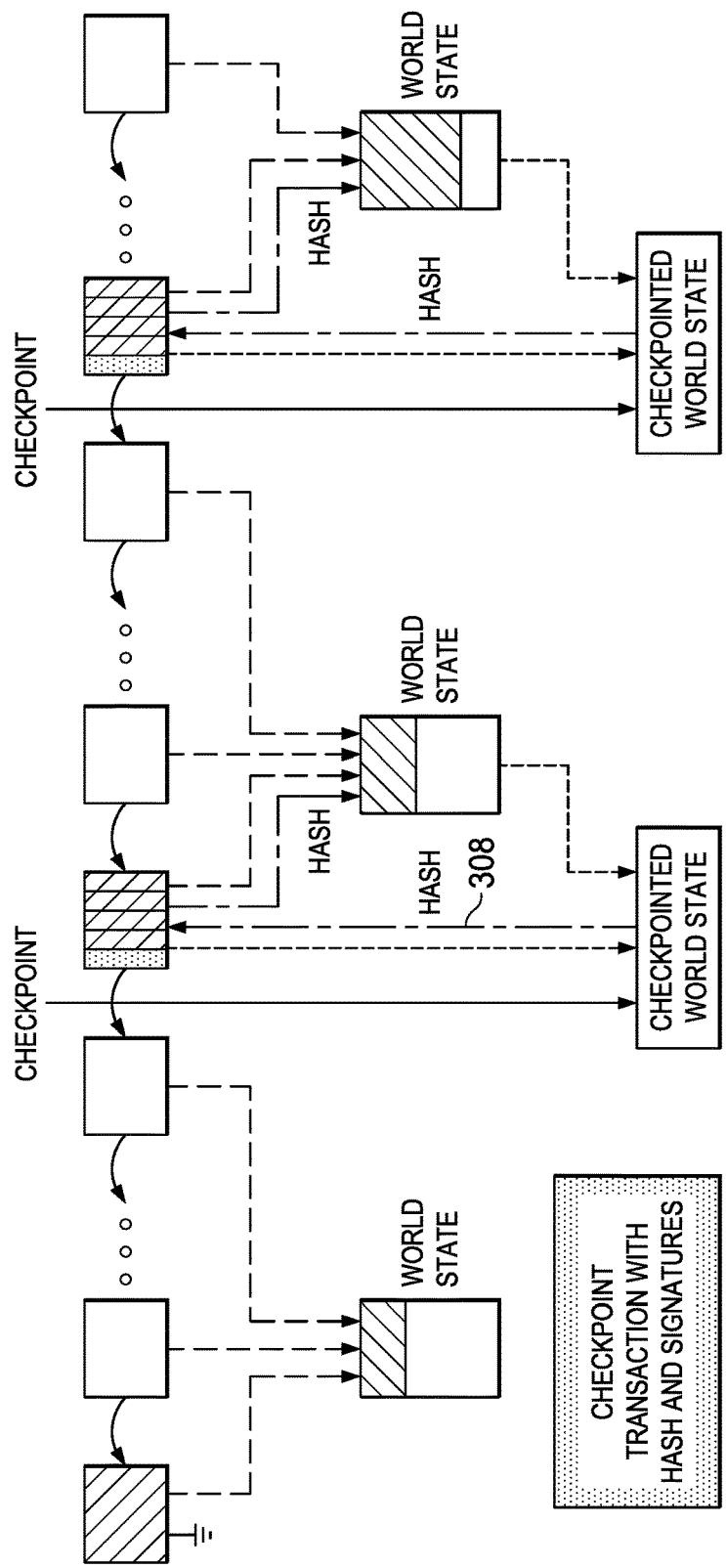
FIG. 3 depicts a full checkpoint on the permission blockchain with hashes included.
Figure 4:
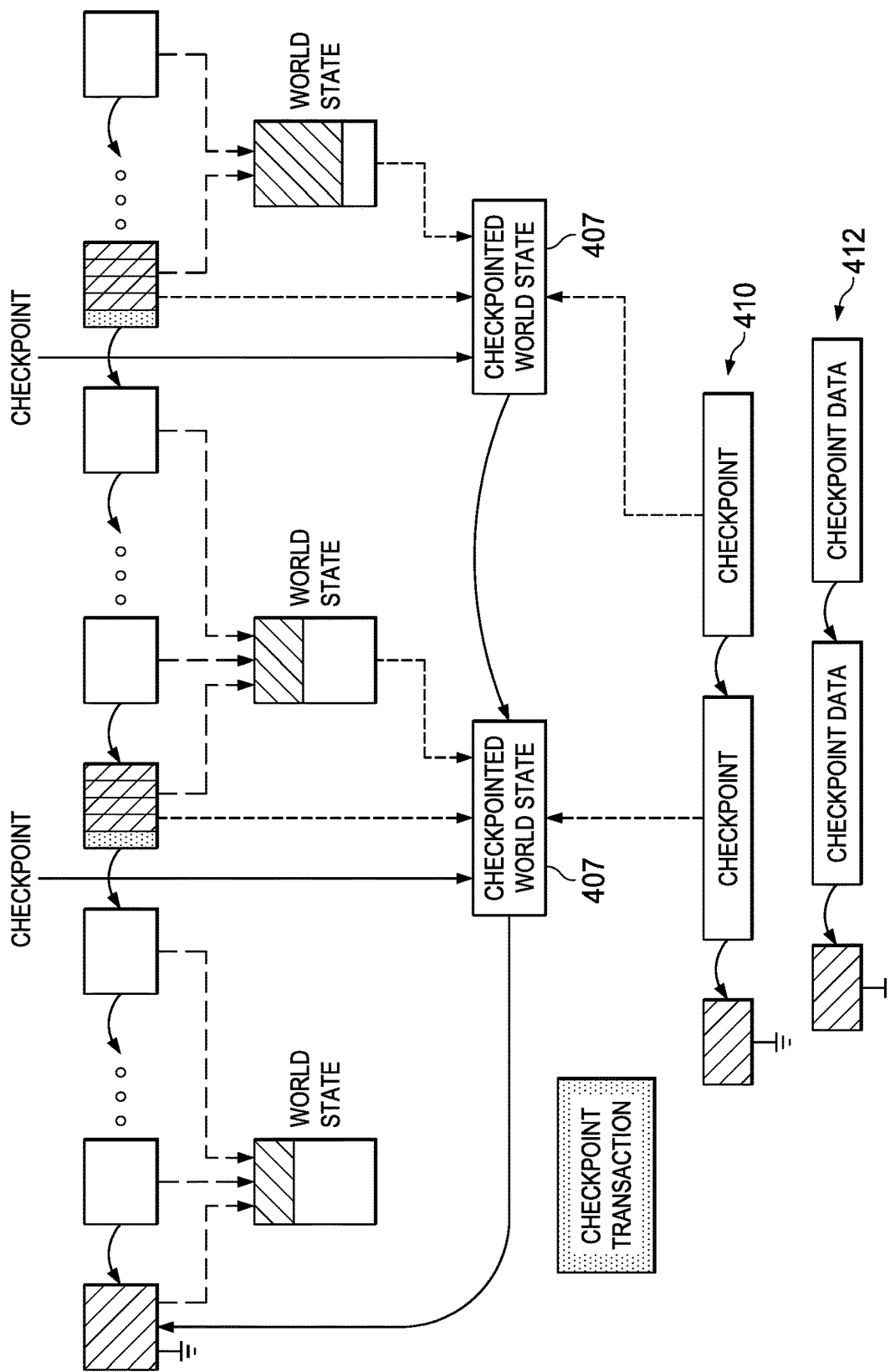
FIG. 4 depicts an alternative for the basic checkpoint.

FIG. 2 depicts the technique of a first embodiment of this disclosure wherein a computation of a checkpoint 201 of a full state of a blockchain is performed on some periodic basis, typically as defined by a policy. This embodiment is the full world state representation (for the checkpoint). In this approach, preferably a global variable (previous_checkpoint_hash) is added, and that variable indicates a next point (such as a block number) when a next checkpoint 203 will be computed and recorded. As described above, all consenting peers must compute the checkpoint at the same block. During checkpoint processing, the current values of world state (or current view of the ledger) are saved, as depicted by the line 205 from checkpoint 201 to the checkpoint world state box 207. The hash 208 of the checkpointed world state 207 is placed in a next block 202 (shaded), right after the checkpoint 201. The checkpointed world state 207 represents the checkpoint, as will be seen. A pointer to the location of the world state checkpoint is also placed in this next block. Optionally, the hash of the checkpoint preferably is also written to world state in the global variable "previous_checkpoint_hash." These hashes 308 are depicted in FIG. 3. FIG. 4 expands on this checkpointing process to illustrate that the checkpoints (and, in particular, the checkpointed world states 407) can be chained together or placed in a separate blockchain (a meta-blockchain, such as 410 and 412). The meta blockchain 410 contains blocks labeled checkpoint, each block contains at least the hash of a checkpoint, the type of checkpoint (optional), and a pointer to the location of the checkpoint. The blockchain 412 illustrates the option of placing the checkpoint data into its own blockchain. In such case, a global system variable (previous_checkpoint) is added to the world state. Checkpoint traversal is simple and fast when checkpoints are chained together in this manner.

Figure 5:
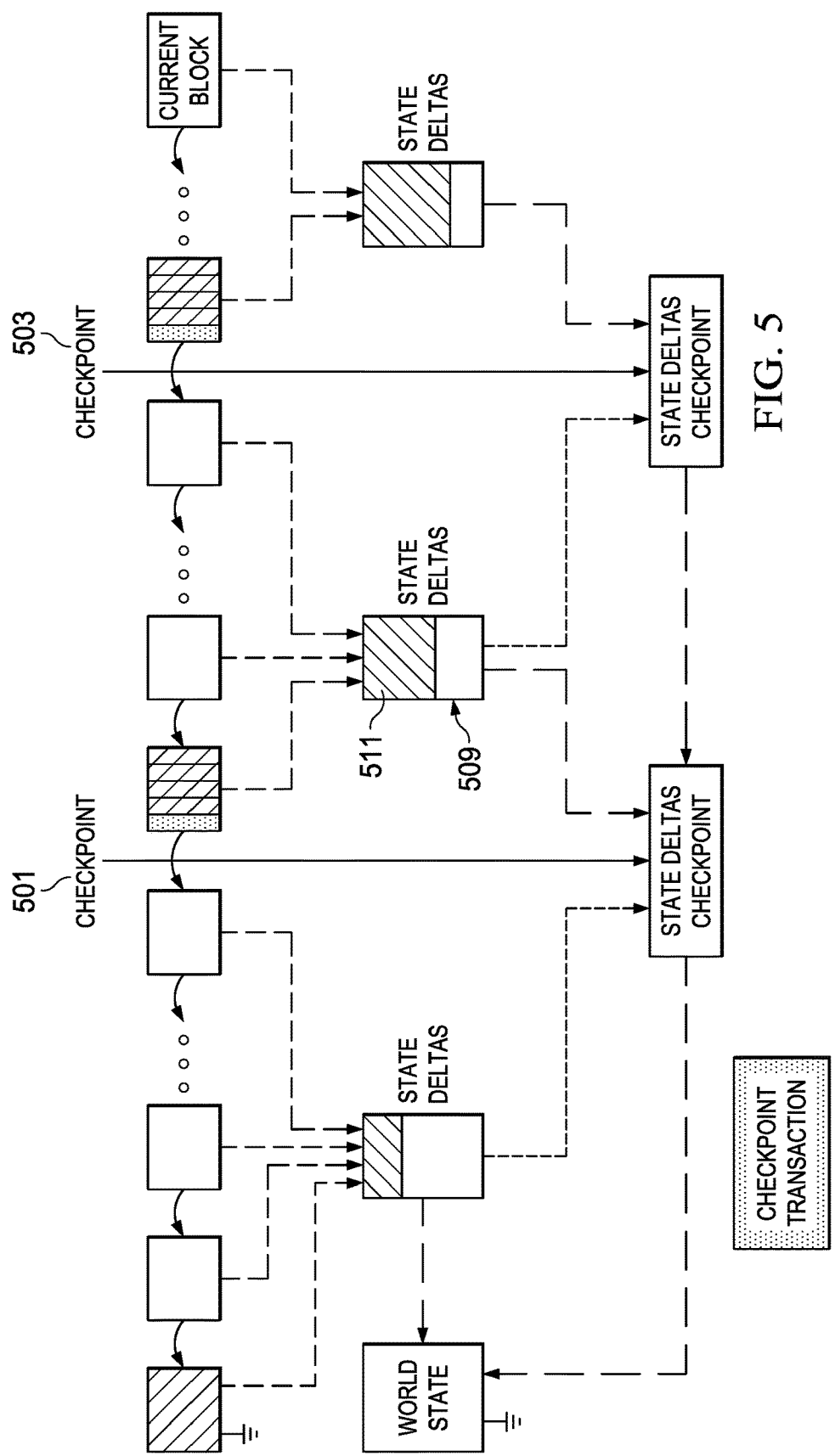
FIG. 5 depicts an alternative embodiment involving checkpointing deltas instead of full state.
Figure 6:
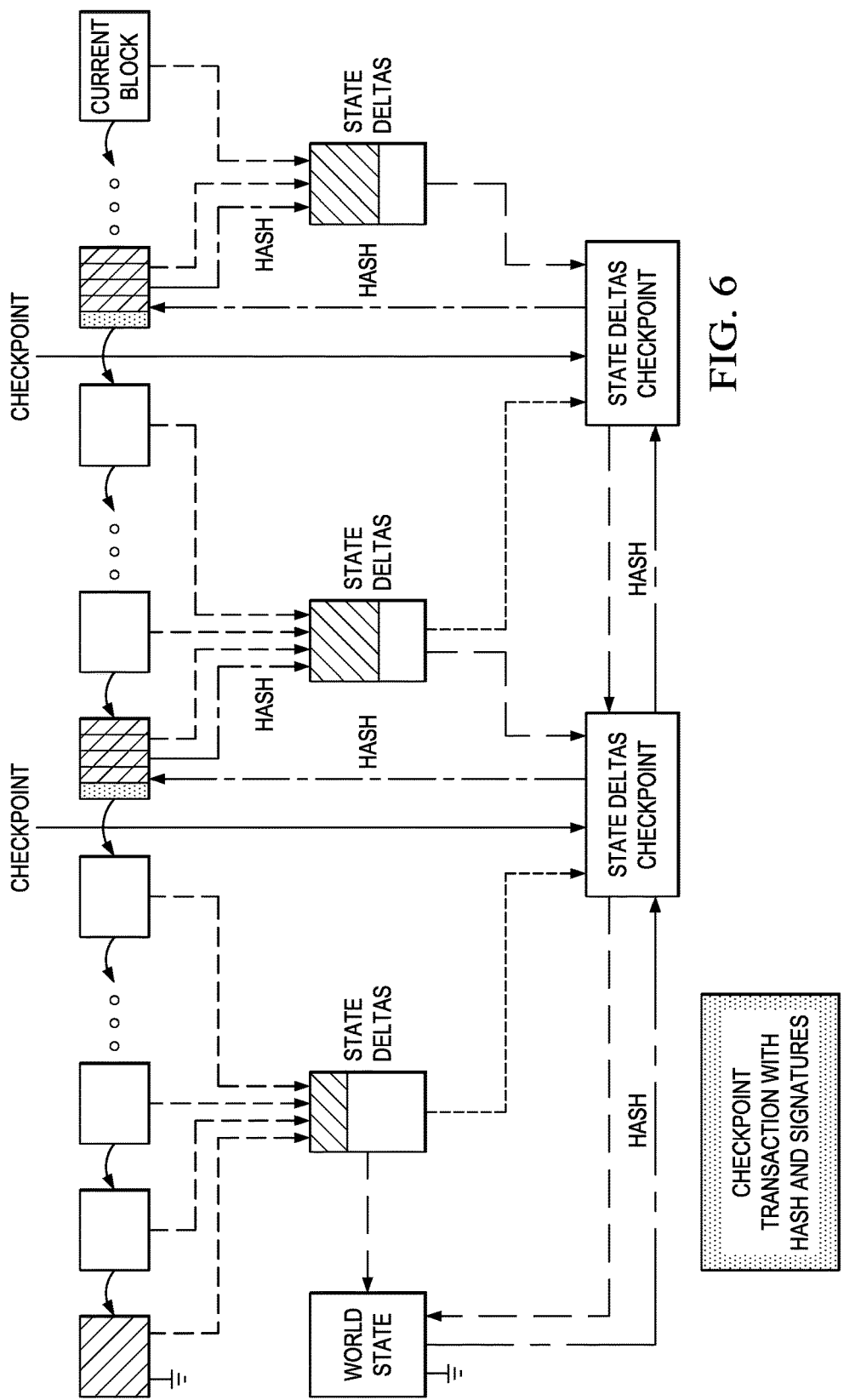
FIG. 6 depicts hashes associated with checkpoints using deltas.

FIG. 5 depicts an alternative embodiment wherein the world state representation is delta-based. In particular, and instead of having each checkpoint contain the entire world state (or current view of the ledger as in FIG. 3 or 4), FIG. 5 represents each checkpoint 501, 503 containing the delta (or changes) 509 since the previous delta checkpoint. In this drawing, the changes as opposed to the entire world state (the logical view of the world state) are depicted. The shaded segments 511 represent those variables that have changed. As illustrated, the amount of change that occurs in each epoch (time between delta checkpoints) is dependent on the changes recorded by the transactions during the epoch. As before, the transactions in each block operate on the world state. In this embodiment, logic (e.g., some data structure) is required to keep track of the variables in the world state that have changed since the most recent checkpoint, and the corresponding current values of the changed variables. There are multiple ways to track variable changes. For example, the first time a variable is changed (either modified or added to world state) the variable can be recorded on a list. Checkpoints occur as previously described with the difference that the checkpoint state only contains a view that represents the variables that have changed since the previous checkpoint. In addition, each delta checkpoint contains a pointer to the previous delta (or full) checkpoint. As has been previously described, prior to the first checkpoint any pointer to the previous checkpoint are to the genesis block. Also, as previously described, the data (or blocks) associated with each checkpoint can be stored on a separate blockchain. FIG. 6 depicts where the hashes preferably are located, which is similar to the approach for the full world state checkpointing as described in FIG. 4.

Although not depicted, these two mechanisms can be interleaved to create a hybrid implementation that has the benefits of both full and delta world state checkpointing. This is the mixed world state representation as previously described. The advantage of delta world state checkpointing is that the checkpoints can be computed faster because, all other things being equal, each checkpoint contain less state than a full world state checkpoint. The disadvantage of only using deltas checkpoint is that this approach does not allow for pruning, because all deltas are needed to represent the current world state. Nominally, the hybrid approach requires the equivalent of two counters, one indicating how often to perform a delta world state checkpoint, and the another to indicate how often to perform a complete world state checkpoint. Whenever a complete checkpoint is performed, the delta checkpoint counter is reset. If at any point both counters indicate a checkpoint at the same block, the complete checkpoint takes precedence, and the delta checkpoint counter is reset. In general, the global checkpoint counter must be larger than the delta checkpoint counter, otherwise delta checkpoints will never occur. Each world state checkpoint dataset (or block) preferably has an indicator as to which type of checkpoint was created (full or delta). All checkpoints, full and delta, preferably are chained together. For example, the system may be configured to do delta world state checkpoints weekly and full world state checkpoints monthly. In general, the frequency of world state checkpoints preferably is driven by the transaction rate and other business policy requirements.

Figure 7A:
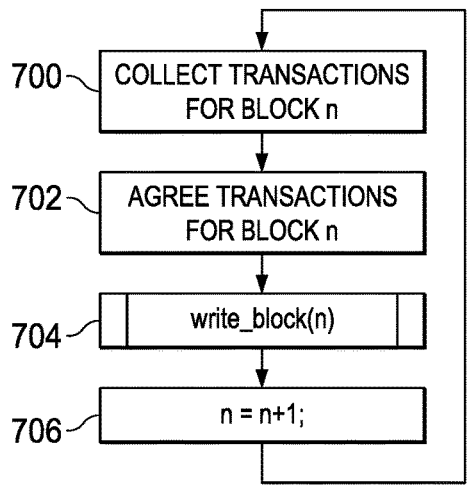
FIGS. 7A, 7B and 7C depict the basic processing flows to create permissioned blockchain checkpoints according to this disclosure.

Turning now to the process flow for creating checkpoints, FIG. 7A shows an overall structure of a program (or computer) that is acting as a committer to a blockchain. This is a known operation. A committer is an entity that writes a transaction to the blockchain, and it may also be a validating peer. The description is high level, and it does not necessarily represent how the functions are separated into modules. Starting at the top, any program that is authorized to write to a blockchain must first collect transactions for the next block to be written. This is step 700. Next, at step 702, the program (namely, the committer) must reach agreement with the other authorized writers on which transactions go into the block. After there is agreement, at step 704 the block is written. Finally, at step 706, the block number is incremented before starting to collect the set of transactions that go into the next block. For permissioned blockchains, which is a preferred embodiment herein, the order of the transactions in a block is globally-agreed upon. The write_block function (step 704) writes the next block to the chain. This step includes updating the current value of all variables in the world state modified by transactions in the block, preferably based on the order of execution of the transactions within the block.

Preferably, step 702 refers to whatever consensus algorithm is used to agree upon the contents of the next block in the blockchain. There are multiple consensus algorithms, well-known in the art, that can be used in a blockchain. These include, for example, Practical Byzantine Fault Tolerance (PBFT), Phase King, Paxos, Raft, Ripple Protocol Consensus Algorithm, among others. A typical consensus algorithm elects a logical leader entity that the other entities follow. This is the notion of leader election. According to this disclosure, preferably the checkpoint is independent of the consensus algorithm provided there is a point at which all committers to the blockchain can synchronize with all other committers between two blocks.

Figure 7B:
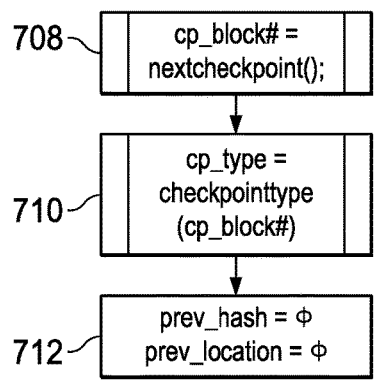
Figure 7C:
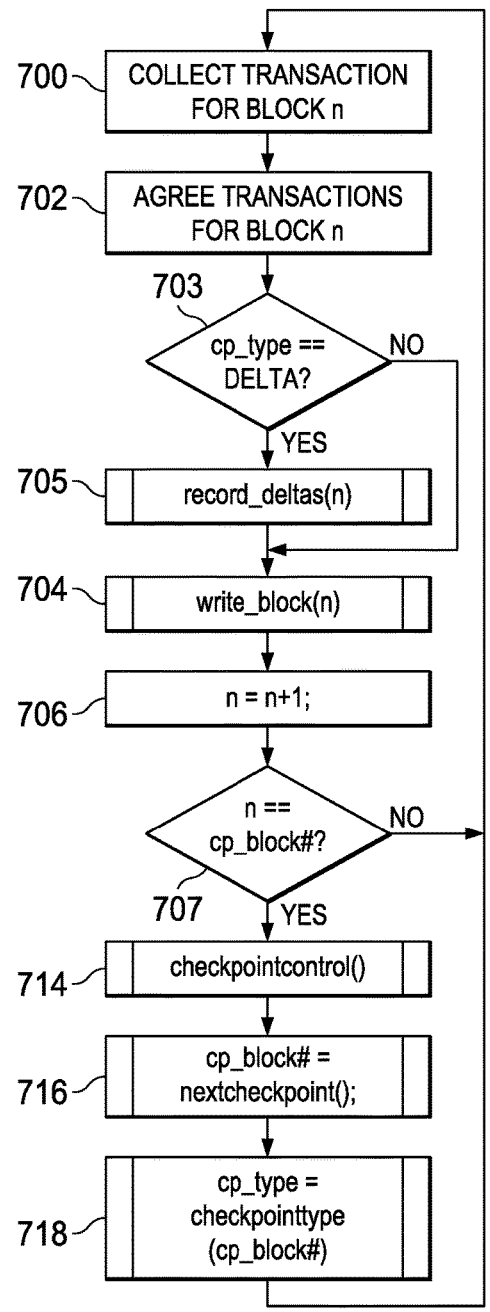

FIG. 7B and FIG. 7C depict how to modify the approach in FIG. 7A to accommodate checkpointing according to this disclosure. FIG. 7B includes three steps 708, 710 and 712 that are configuration operations that are performed before the system starts committing blocks. In particular, step 708 defines a global variable that holds the number of the block before which the next checkpoint will be taken. Step 710 defines a global variable that indicates which type of checkpoint will be taken; its value either is complete (for a complete (full) checkpoint) or delta (for a delta checkpoint). Step 712 defines a variable that contains the hash of the previous checkpoint; this variable is initialized to empty (no checkpoint). Step 712 also defines a variable that contains a reference to the location of the previous checkpoint, and it is initialized to empty (no location).

This process flow is written from the perspective of starting a new blockchain. One skilled in the art will appreciate that similar set of operations must be performed and synchronized with the existing committers (those systems authorized to write to the blockchain) when a new system is joining an existing chain, or when rejoining after any period of suspension. FIG. 7C depicts changes to FIG. 7A that are implemented to enable checkpointing, and the steps 700, 702, 704 and 706 correspond to those shown in FIG. 7A. The process flow shown in FIG. 7C is shown from the point-of-view of a committer. As depicted, immediately before the block is written at step 704, a test is performed at step 703 to see whether delta checkpoints are being performed. If (as indicated by a positive outcome) the next checkpoint will be a delta checkpoint, then the state deltas (changes to world state) associated with the transactions in the block are recorded. This is step 705. One skilled in the art will recognize that this may also be done immediately after the write. The recording of the deltas and the write of the block to the blockchain should be considered an atomic operation; thus, they should both happen or both not happen. Any technique known to the art for tracking the changes to world state caused by transactions in a block can be used for this purpose. The function record_deltas in step 705 preferably maintains a list of the variables modified and their last (or current value). Note that after the write block 704 is complete, the values maintained by record_deltas contain the current value of all modified variables as of the block just written.

After the block number is incremented at step 706, a check is done at step 707 to see if this is the block before which the checkpoint must be taken. If (as indicated by a negative outcome) it is not, the committer returns to step 700 and starts collecting transactions for the next block. If (as indicated by a positive outcome) it is the block before the next checkpoint, the committer continues at step 714 and calls a checkpoint control function, called checkpointcontrol( ), to perform the checkpoint. At step 716, the committer then selects the next checkpoint block number and the next checkpoint type 718, based on configuration information (not shown). After this, control returns to step 700 and the committer starts collecting transactions for the next block. This competes the processing.

Figure 8:
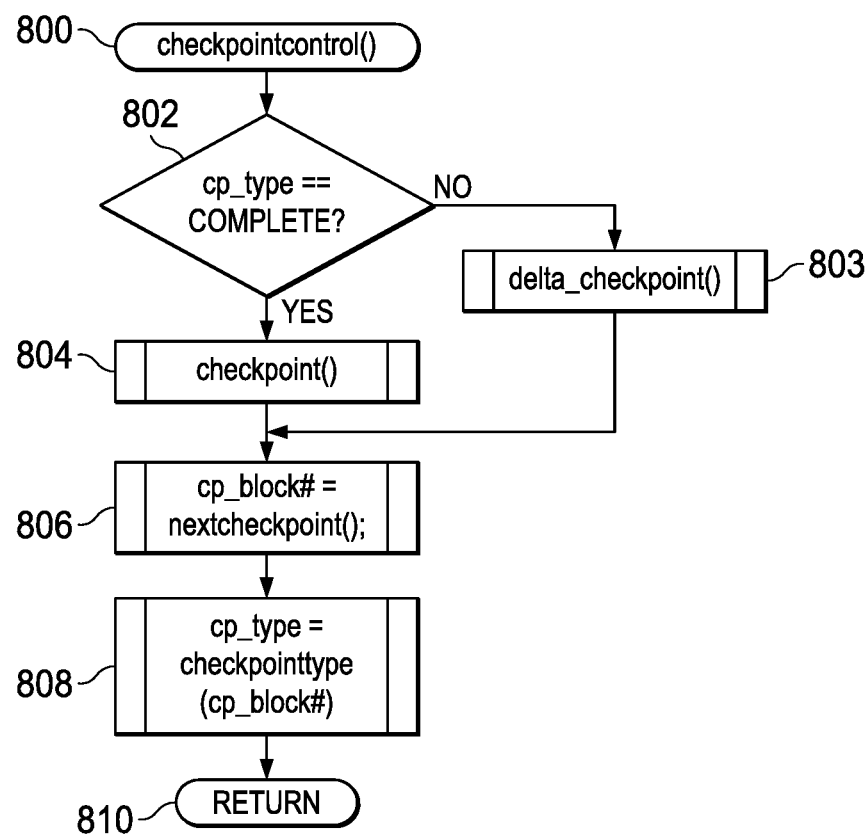
FIG. 8 depicts a checkpoint control flow routine.

FIG. 8 depicts the checkpoint control function. This process flow represents a system that can do complete checkpoints, delta checkpoints, or a combination of the two (the mixed or hybrid representation). Preferably, configuration parameters associated with the blockchain determine whether the blockchain is doing complete checkpoints, delta checkpoints, or a combination. As noted above, if the blockchain is doing a combination, delta checkpoints are done more frequently than a complete checkpoint. In this process flow, it is assumed that checkpoint frequency is determined by block number. Frequency can be determined by any measure that is detectable by code and can be consistently maintained across nodes of a distributed system. Because it is assumed that delta checkpoints are more frequent, it is also assumed that complete checkpoints are done, e.g., as an integer multiplier of the number of blocks included in a delta checkpoint. For example, if delta checkpoints are done every 150 blocks, then a complete checkpoint could be done, say, every 2400 blocks. This example is not intended to be limiting. One skilled in the art will appreciate that this mechanism could be replaced by time or any other measure, e.g. deltas once a day, complete checkpoints once a week, or the like. All such variants are within this scope of this disclosure, and the actual checkpoint strategy may vary widely.

Figure 9:
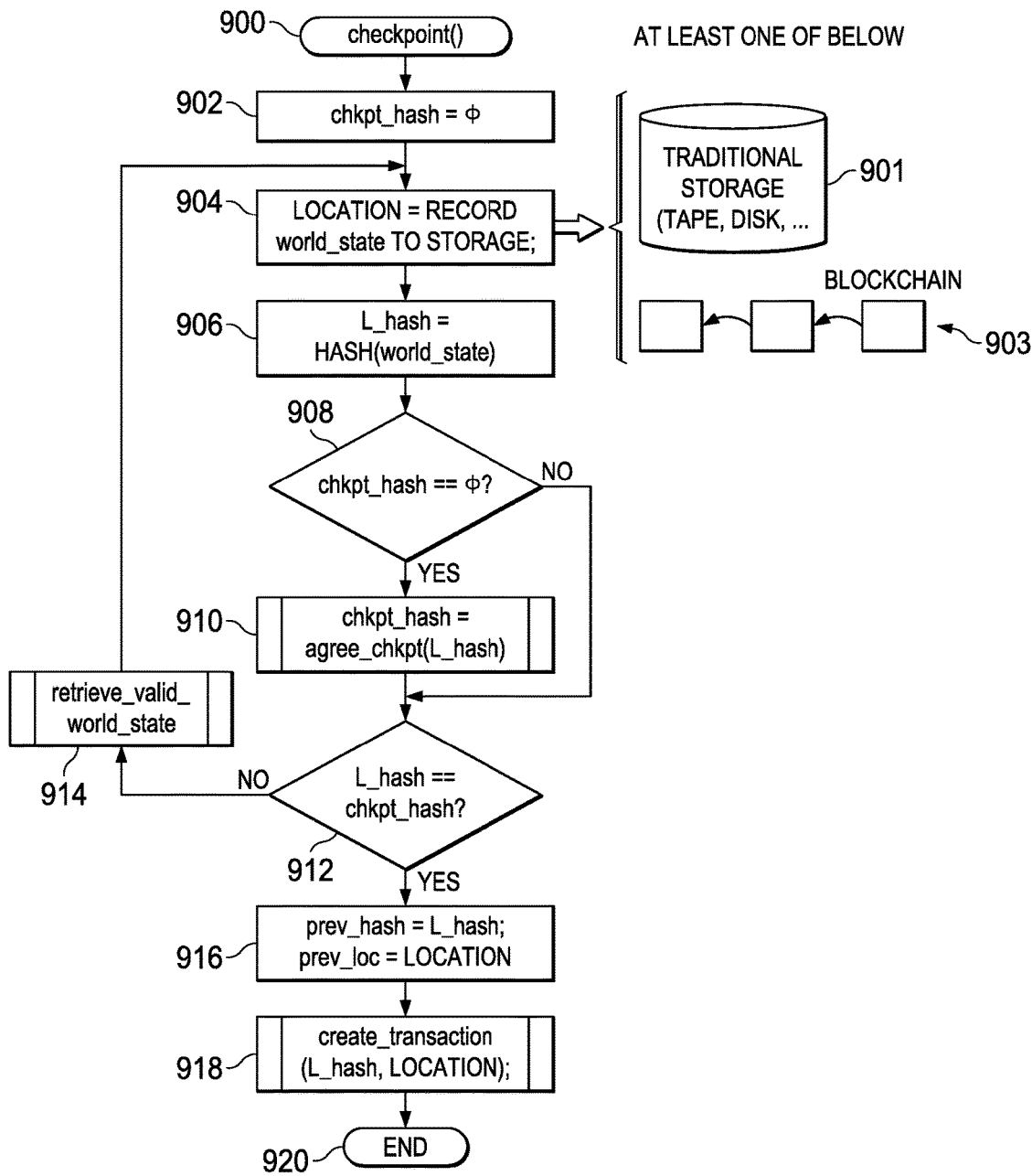
FIG. 9 depicts a preferred checkpoint algorithm.
Figure 10:
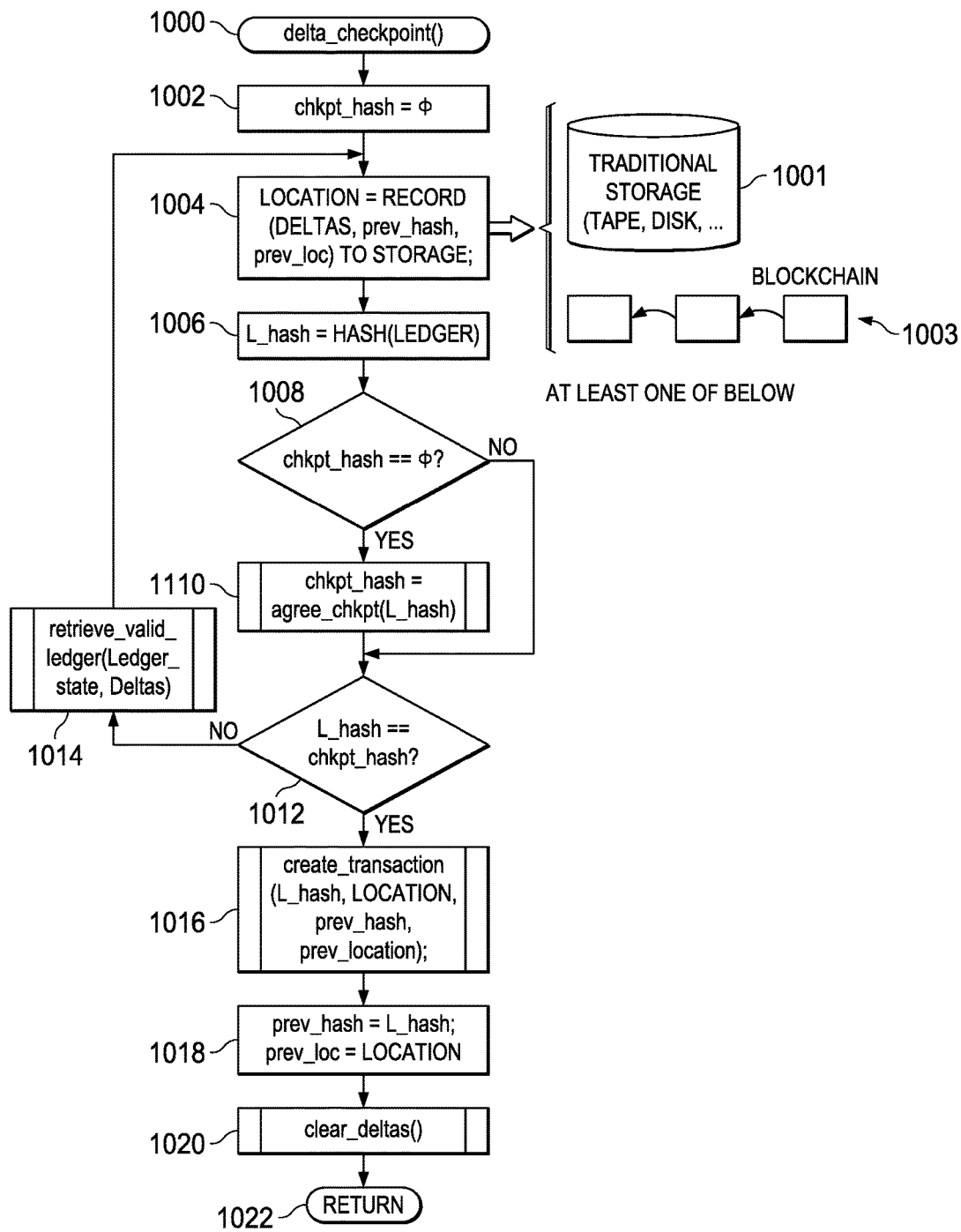
FIG. 10 depicts a delta checkpoint algorithm.

As depicted, the process 800 begins at step 802 by determining which type of checkpoint is being taken, namely, complete or delta. If a complete checkpoint is to be done (as indicated by a positive outcome), the function continues at step 804 and calls checkpoint( ), which is represented in FIG. 9 below. If (as indicated by a negative outcome) a delta checkpoint is to be done, the function branches to step 803 and calls delta_checkpoint( ), which is represented in FIG. 10 below. At step 806, the block number of the next checkpoint is calculated using nextcheckpoint( ). At step 808, the type of the next checkpoint is recorded checkpointtype(cp_block#). While this flowchart uses separate functions, one skilled in the art will recognize that both values can be computed using a single function call (or inline). If the next checkpoint is going to be complete, the basic processing flow, as illustrated in FIG. 7C, may stop recording deltas because the complete state (including any deltas since the last delta checkpoint) will be recorded. At step 810, checkpointcontrol( )returns to the code loop described in FIG. 7C.

FIG. 9 depicts the processing required to do a complete checkpoint. The process 900 begins at step 902 by setting the agreed-upon checkpoint to empty (no agreement). At step 904, the world state is recorded to storage. This step also saves a reference to the location of the checkpoint data in "location." As depicted, the world state is recorded for example on traditional media 901 (e.g., tape, disk, cloud, etc.), or in its own blockchain 903. The world state that is recorded is called the checkpoint. After recording the world state, the routine continues at step 906 to compute the hash of the checkpoint state. Next, step 908, the routine checks whether agreement (consensus) has already been reached on the hash for this checkpoint. If not, then the routine uses agree_chkpt to reach agreement with other nodes (committers) on the hash of the checkpoint. After agreement (depicted at step 910), a check is done at step 912 to see if the checkpoint hash, L_hash, calculated by this program, matches the agreed-upon hash, chkpt_hash. If not, the function branches to step 914 to retrieve the valid world state from another committer (using retrieve_world_state), and control then loops back to recording world state at step 904. Once (as indicated by a positive outcome of step 912) the hash matches the agreed-upon hash, at step 916 the hash of the checkpoint data is saved in prev_hash, and a reference to the location of the checkpoint data is saved in prev_location. These values are saved so that, if delta checkpoints are being taken, they can be properly linked into the complete checkpoint. Next, at step 918, the routine creates a transaction that will be the first transaction in the next block containing the hash of the checkpoint state and a reference to the location. This transaction can contain as much information as desired. At step 920, the function ends, which returns control back to the caller of checkpointcontrol( ) function.

The following provides additional details regarding the checkpoint process flow. As depicted in FIG. 9, step 902 sets chkpt_hash to empty. As noted above, this variable represents whether there has been agreement on the hash of the checkpoint. An empty (null set) represents a lack of agreement. In step 904, the world state is recorded, and L_hash (step 906) represents the hash calculated on the world state. The first decision point 908 is asking whether agreement has been reached on the hash of the checkpoint. If the running instance does not know about the agreement, chkpt_hash will still be empty. The affirmative outcome of the decision at step 908 tests for the equivalence. If chkpt_hash is empty, chkpt_hash is set to the agreed-upon hash of the world state in step 910. In particular, the function agree_checkpt takes as a parameter the local hash of the routine calling it and communicates with all other participants to reach agreement (consensus) on the hash. As noted above, the particular consensus algorithm used to agree on the hash is not a limitation. After the agreed-upon hash has been found, step 912 is performed to see if the local hash is the same as the agreed-upon hash. If it is not, then the process must retrieve valid world state from another committer, which it does in step 914. Once again, there is no particular requirement in how this is done. The routine then loops back and records that state. When the routine loops through again, the hash of the now newly-recorded world state is checked again to see if there is an agreed-upon hash. The second time through, however, chkpt_hash is no longer empty (in other words, agreement was previously reached), so the routine only has to check (in step 912) that the local hash equals the agreed-upon hash. Thus, the process continues to loop until it gets a copy of the world state that matches the agreed-upon hash.

FIG. 10 depicts describes the processing required for a delta checkpoint. The processing up through the check for agreement is the same as in FIG. 9 for the complete checkpoint algorithm except that what is recorded on storage at step 1004 are the state deltas, the hash of the previous checkpoint, and the location of the previous checkpoint. As will be seen, step 1014 is also different, as the valid world state and state deltas must be retrieved. Immediately after agreement is reached at step 1012, the transaction that will represent the delta checkpoint is created at 1016. This transaction contains the hash of the delta checkpoint state, a reference to the location of the delta checkpoint, and optionally the hash of the previous checkpoint and a reference to the location of the previous checkpoint. Next at step 1018, the hash of the current checkpoint is saved as the hash of the previous checkpoint, and the reference to the location of the current checkpoint is saved as the reference to the location of the previous checkpoint. Finally, at step 1020, the routine clears the information on which variables were changed using clear_deltas. This is done so that the next delta checkpoint will represent the variables changed since this checkpoint. After clearing the delta information, and at step 1022, control returns back to the caller of the checkcpoint-control( ) function. In this process flow, the following steps correspond to those shown in FIGS. 9: 1002 (to 902), 1006 (to 906), 1008 (to 908), 1010 (to 910) and 1014 (to 914).

For completeness, the following is a glossary defining the variables, function and symbols used in the above-described process flows:

agree_chkpt(hash) is a routine that returns the agreed upon hash of the checkpoint. Its argument is the hash of the checkpoint taken by the participating process. It communicates with other authorized committers to agree on the value of the checkpoint. Any reasonable consensus algorithm can be used to reach agreement.

checkpoint( ) is the function that records a complete checkpoint. It is described in detail in the flowchart in FIG. 9.

checkpointcontrol( ) is the control program for taking a checkpoint. It function is described in detail in the flowchart in FIG. 8.

checkpointtype(n) returns the type of checkpoint that should be taken before the indicate block. This is done by consulting configuration parameters. The value it returns is either delta or complete.

clear_deltas( ) is a routine that clears the list of variables modified in world_state since the last checkpoint.

cp_block# is a global variable that holds the number of the block before which the next checkpoint will be taken cp_type is a global variable that indicates which type of checkpoint will be taken next. Its value is either complete (for a complete checkpoint) or delta (for a delta checkpoint).

create_transaction( ) is a routine that creates a transaction that will be part of the next block written. It implies that it will be the first transaction in the next block because it is created before the committer starts collecting transactions for the block.

delta_checkpoint is the function that records (takes) a delta checkpoint. It is described in the flowchart in FIG. 10.

hash is a routine that returns a hash of its argument.

L_hash contain the hash of the world state.

n represents a block number. In one non-limiting embodiment, it is assumed to start at zero.

nextcheckpoint( ) is a function that returns the block number before which the next checkpoint will be taken. This is done by consulting configuration parameters.

prev_hash contains the hash of the previous checkpoint and is initialized to empty (no checkpoint).

prev_location contains a reference to the location of the previous checkpoint and is initialized to empty (no location).

record( )) is a routine that writes its arguments to storage. It is used here to write the world state to storage. The storage could be traditional storage or a blockchain. The location where world state is written is controlled by a configuration parameter. Record returns the location of the world state that was just written.

record_deltas( ) is a routine that adds to the list of variables modified, the variables modified by transactions in the current block that were not previously on the modified variables list. It also updates the value of all variables modified by the current block to be the value after all the transactions have been executed in order. This tracking could be done in other places within a permissioned blockchain.

retrieve_valid_world_state is a routine that sets the current world_state to the agreed upon world_state represented by the last checkpoint. If a second parameter is provided, it also returns the recorded set of deltas since the last checkpoint.

world_state the world state of the blockchain at a particular point in time.

write_block( ) writes the current block to the blockchain; all changes made by the transactions in the block to world_state are committed by write_block. By convention, the first item in the block is the hash of the previous block followed by the transactions contained in this block. If a checkpoint was taken the first transaction in the block will be the checkpoint record.

== is a Boolean operator. a==b returns true (or Y) if the value of a is equal to b, the value of a and b are not changed by this operator. It returns false (or N) otherwise.

The following are other technical considerations for auditing checkpoints. The first is the issue of garbage collection. In particular, one issue with creating checkpoints on long-lived blockchains is that some chaincode may no longer be active, thus leaving behind data in the world state that is no longer accessible. Other chaincodes may have been updated and no longer use some of the variables in the world state. While not required, preferably the checkpoint mechanism includes the capability to identify these dead variables in the blockchain and world state so they are not carried forward in the checkpoint state. In the case of disused chaincodes, this process can be automatic by identifying those variables associated with that chaincode's namespace in the world state. Whenever the infrastructure indicates that a particular chaincode is no longer active, its variables and state should be marked for removal after the next checkpoint. In this way their values at time of deletion will be recorded in a checkpoint and can be audited. For active chaincode, the currently live variables can be identified through one or more of: static analysis, dynamic analysis, program annotations, or application code. Dead variables associated with active chaincode either can be automatically pruned from the checkpoint (if recorded in at least one checkpoint), or they can be flagged for deletion and left to an administrator and/or developer to decide whether to keep or delete.

Another audit issue concerns referencing off-blockchain data. In particular, chaincode may reference non-blockchain data. In such case, the chaincode that utilizes non-blockchain data in a decision (transaction) should record that data in the chain (or world state). This ensures that the actions of the chaincode are auditable.

One other audit issue concerns pruning. While data storage has become quite inexpensive, there are both practical, business and legal reasons for needing to prune the blockchain and world state. For space-limited systems (e.g., IoT applications), the system may need to recover storage space. This is quite easy with checkpointing, where data prior to a checkpoint can be deleted. When pruning occurs, references to blocks prior to the checkpoint need to refer to a new genesis block (that indicates that storage pruning had occurred). Optionally, a reference to a permanent copy of the block chain can be stored in this new genesis block. Similarly, for legal reasons (e.g., right to be forgotten or right to erasure, GDPR), the data prior to a checkpoint can be deleted. In particular, for these legal scenarios, garbage collection may be necessary to strip the blockchain checkpoints of expired data.

Enabling Technologies

Figure 11:
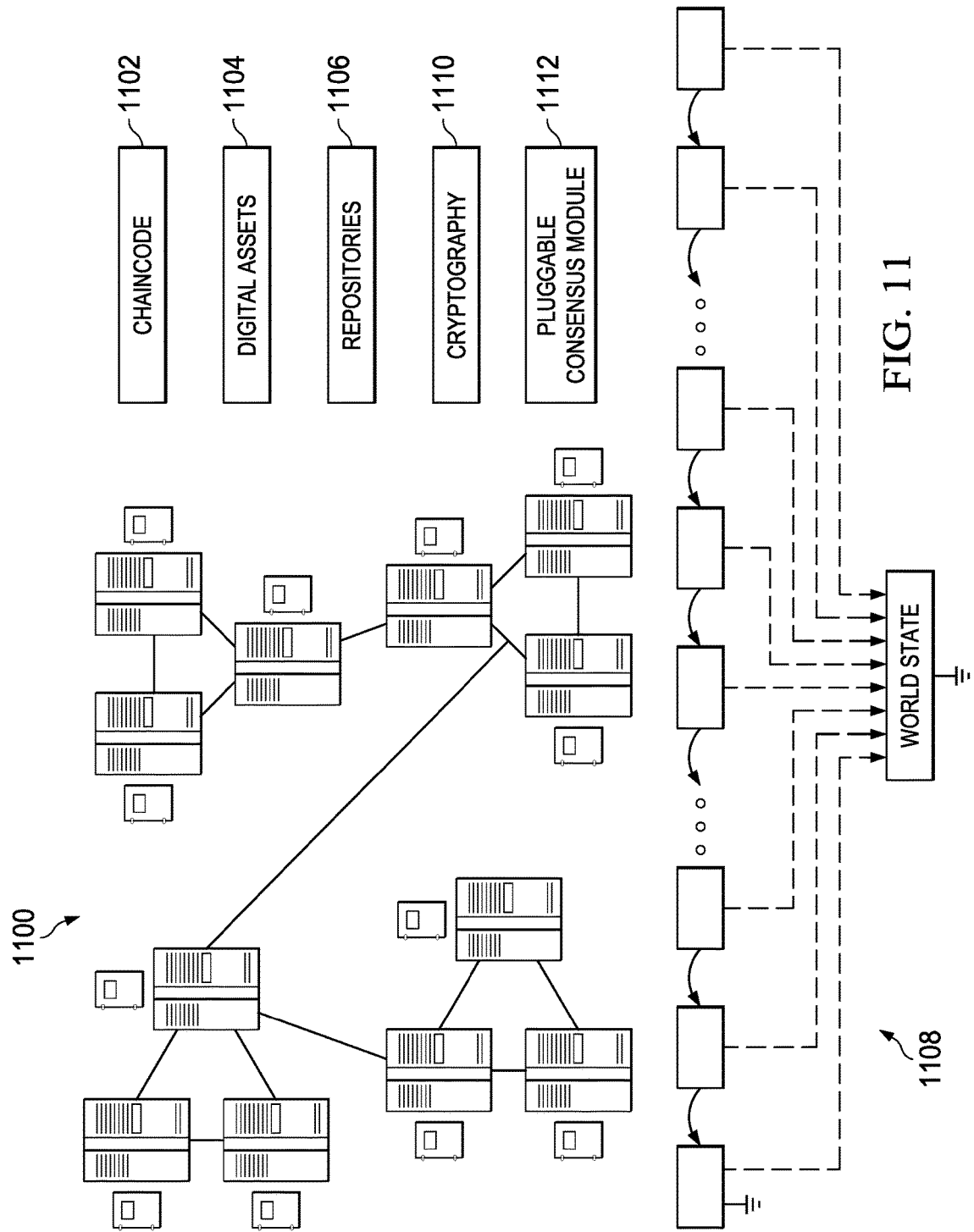
FIG. 11 is an exemplary block diagram of a peer-to-peer network comprising a blockchain business network in which the techniques of this disclosure may be implemented.

As depicted in FIG. 11, a blockchain is implemented in the context of a distributed peer-to-peer network 1100 in which the nodes make independent processing and computational decisions irrespective of what other peer nodes may decide. To form a blockchain network, the various computing entities (nodes) in the peer-to-peer network have associated therewith a decentralized consensus mechanism. In particular, all validating nodes in the network run the same (agreed-upon) consensus algorithm against the same transactions, and thus validate (or invalidate) each transaction. Valid transactions are written to the ledger. As depicted, the central elements of a blockchain implementation are chaincode 1102, digital assets (that underlie the transactions) 1104, record repositories 1106, the blockchain and world state 1108 providing consensus, and cryptographic security 1110. In addition, a Hyperledger implementation preferably supports a pluggable consensus model 1112 that allows for a variety or specialized or optimized consensus algorithms to be applied. As noted above, preferably the blockchain 1108 is a shared, permissioned ledger that is visible to all participating members of the business network. The ledger may be replicated on one or more systems. The consensus algorithm ensures that all systems have consistent copies of the ledger. A consensus protocol is agreed to by all participating members of the business network, and it ensures that the ledger is updated only with network-verified transactions. Cryptography 1110 ensures tamper-proof security, authentication, and integrity of transactions. Cryptographic functions including hashing and digital signatures. Hashing ensures integrity of the transaction input. Digital signatures ensure that the receiver receives the transactions without middle parties modifying or forging the contents of transactions, while also ensuring that the transactions originated from senders (signed with private keys) and not imposters. As also noted, the chaincode 1102 encapsulates participant terms of agreements for the business that takes place on the network; this code is stored on the validating nodes in the blockchain and triggered by transactions. When configured as an append-only system of record (SOR) and visible to all participating members of the business network, a shared, permissioned ledger is created.

Figure 12:
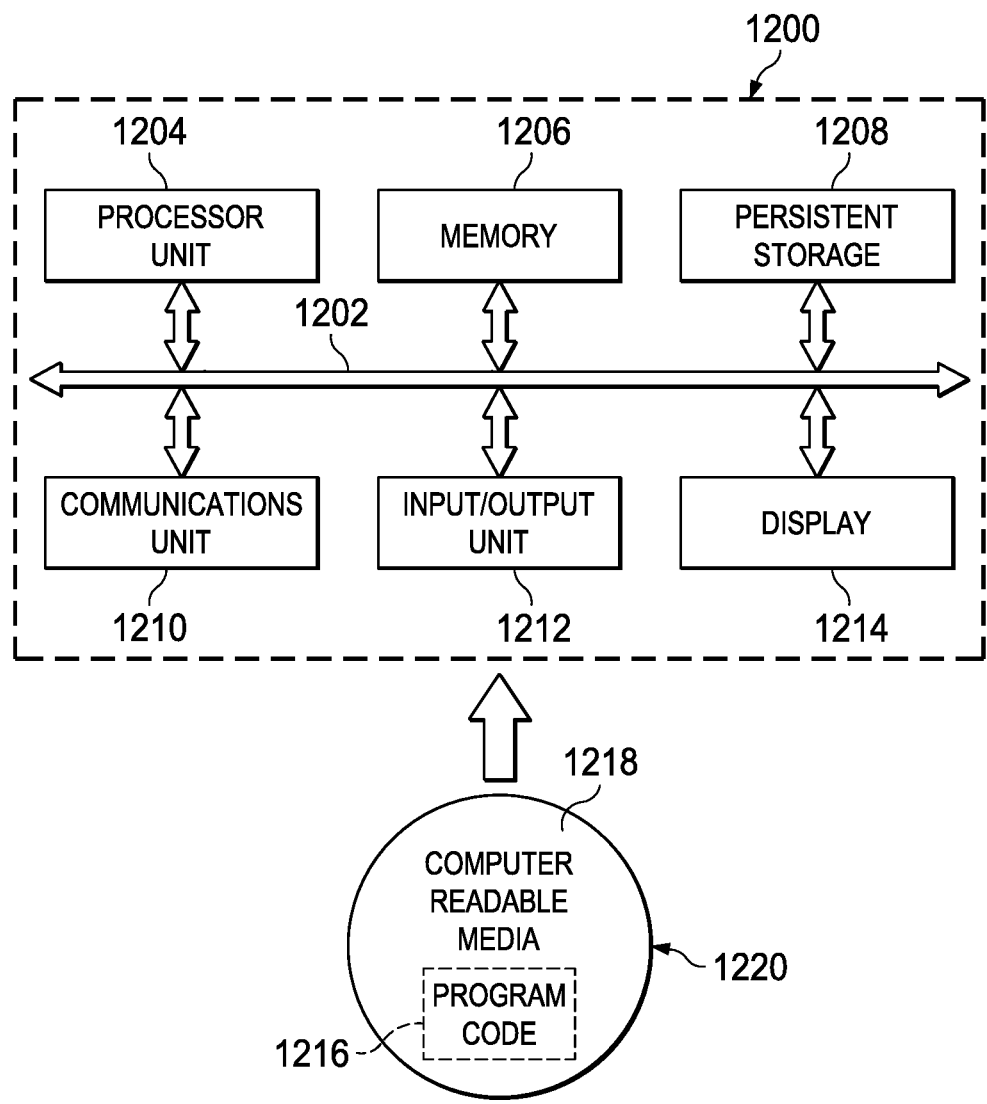
FIG. 12 depicts data processing system in which exemplary aspects of the illustrative embodiments may be implemented.

With reference now to FIG. 12, a block diagram of an exemplary data processing system is shown for use as a validating peer or other computing entity as described herein. Data processing system 1200 is an example of a computer in which computer usable code or instructions implementing the processes for illustrative embodiments of the disclosure may be located. System 1200 typically represents one of the computing entities (validating peers) in the peer-to-peer distributed network as depicted in FIG. 11.

In this illustrative example, data processing system 1200 includes communications fabric 1202, which provides communications between processor unit 1204, memory 1206, persistent storage 1208, communications unit 1210, input/output (I/O) unit 1212, and display 1214.

Processor unit 1204 serves to execute instructions for software that may be loaded into memory 1206. Processor unit 1204 may be a set of one or more processors or may be a multi-processor core, depending on the particular implementation. Further, processor unit 1204 may be implemented using one or more heterogeneous processor systems in which a main processor is present with secondary processors on a single chip. As another illustrative example, processor unit 1204 may be a symmetric multi-processor (SMP) system containing multiple processors of the same type.

Memory 1206 and persistent storage 1208 are examples of storage devices. A storage device is any piece of hardware that is capable of storing information either on a temporary basis and/or a permanent basis. Memory 1206, in these examples, may be, for example, a random access memory or any other suitable volatile or non-volatile storage device. Persistent storage 1208 may take various forms depending on the particular implementation. For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard and mouse. Further, input/output unit 1212 may send output to a printer. Display 1214 provides a mechanism to display information to a user.

Instructions for the operating system and applications or programs are located on persistent storage 1208. These instructions may be loaded into memory 1206 for execution by processor unit 1204. The processes of the different embodiments may be performed by processor unit 1204 using computer implemented instructions, which may be located in a memory, such as memory 1206. These instructions are referred to as program code, computer-usable program code, or computer-readable program code that may be read and executed by a processor in processor unit 1204. The program code in the different embodiments may be embodied on different physical or tangible computer-readable media, such as memory 1206 or persistent storage 1208.

Program code 1216 is located in a functional form on computer-readable media 1218 that is selectively removable and may be loaded onto or transferred to data processing system 1200 for execution by processor unit 1204. Program code 1216 and computer-readable media 1218 form computer program product 1220 in these examples. In one example, computer-readable media 1218 may be in a tangible form, such as, for example, an optical or magnetic disc that is inserted or placed into a drive or other device that is part of persistent storage 1208 for transfer onto a storage device, such as a hard drive that is part of persistent storage 1208. In a tangible form, computer-readable media 1218 also may take the form of a persistent storage, such as a hard drive, a thumb drive, or a flash memory that is connected to data processing system 1200. The tangible form of computer-readable media 1218 is also referred to as computer-recordable storage media. In some instances, computer-recordable media 1218 may not be removable.

Alternatively, program code 1216 may be transferred to data processing system 1200 from computer-readable media 1218 through a communications link to communications unit 1210 and/or through a connection to input/output unit 1212. The communications link and/or the connection may be physical or wireless in the illustrative examples. The computer-readable media also may take the form of non-tangible media, such as communications links or wireless transmissions containing the program code. The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. As one example, a storage device in data processing system 1200 is any hardware apparatus that may store data. Memory 1206, persistent storage 1208, and computer-readable media 1218 are examples of storage devices in a tangible form.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1206 or a cache such as found in an interface and memory controller hub that may be present in communications fabric 1202.

Computer program code for carrying out operations of the present invention may be written in any combination of one or more programming languages, including an object-oriented programming language such as Java™, Smalltalk, C++ or the like, functional programming languages such as SML, and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 12 may vary depending on the implementation. Other internal hardware or peripheral devices, such as flash memory, equivalent non-volatile memory, or optical disk drives and the like, may be used in addition to or in place of the hardware depicted in FIG. 12. Also, the processes of the illustrative embodiments may be applied to a multiprocessor data processing system, other than the SMP system mentioned previously, without departing from the spirit and scope of the disclosed subject matter.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 12) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. One or more of the above-described functions is implemented in software, which includes but is not limited to firmware, resident software, microcode, and the like. Furthermore, as noted above, the checkpointing functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the checkpoint functions are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The term "checkpoint" is not intended to be limiting. The notion may be described, e.g., as a "snapshot" or other point-in-time data capture.

The "hash" as defined herein may be generated using any conventional hashing function, e.g., MD5, SHA-1, SHA-256, or other cryptographic hash. Generalizing, the hashing function is a computational algorithm that produces a fixed-size, unique hash value, also known as a digest, from variable-sized transaction input. Hashes feature a mathematical property in which a hash can be arrived at uniquely from a given input, but the input cannot be derived from its hash value. A given specific input always results in the same hash value being computed.

As described herein, the world state is shown as separate from the blockchain, but this is not a requirement. When the world state is contained in the blockchain itself, the resulting composite structure is sometimes referred to as a "ledger." When the world state is separate from the blockchain (as in the examples herein), the notion of a "ledger" refers to the state recorded in the blockchain (as opposed to the world state).

The validating peers may be the same entities as the committers, but this is not a requirement.

Checkpoints for Permissionless Blockchains

While the techniques herein are described in the context of a permissioned blockchain, the checkpointing approach may also be used with a permissionless blockchain.

By way of background, the following describes how permissionless blockchains work. Using a known consensus algorithm (e.g., Bitcoin) as an example, in a permissionless chain, there are entities called miners, which are systems that can extend the chain. These entities compete to solve a hard problem (e.g., compute a hash value with specific properties). The first miner to solve the problem extends the chain and starts working on generating the next block. Occasionally, two miners extend the chain concurrently. This is called a fork, and this is where the "longest chain rule" applies. Specifically, after a fork one chain will typically be longer than the other, and this longer chain is considered the winner, or new authoritative state of the blockchain. All the transactions in the shorter chain that are not in the longer chain then need to be added to the blockchain via new blocks. All the while, submitters can continue to broadcast their transactions to multiple miners, although they are not required to do so. Further, normally there is no communication between or among the miners, and no system (or miner) may have a list of all the miners. There are several variations on this scheme, and some combine aspects of permissioned chains.

In the permissioned chain embodiments, there is a consensus on the hash before committing it to a future block. For the reasons stated above, in a permissionless blockchain the miners do not necessarily know the identity of all of the other miners similarly-situated; thus, it is not feasible to get consensus on the hash from all of the miners. A related problem is how to address different hash values that may be generated. A standard assumption is that all miners are running the same code so that their state cannot diverge. Because the chain is verifiable by everyone, however, the correct state can always be constructed by going back to the genesis block of the chain and working forward (or some previous certified checkpoint as introduced by this invention). What is needed in this context is a method to checkpoint that does not rely on capabilities that are not necessarily found in permissionless blockchains.

A solution to this problem is now described. In this approach, and before a checkpoint is generated, it is necessary to delay long enough so that there is confidence (among the equivalent of committers, namely, the miners) that the state of the chain is not going to change while the checkpoint is being taken, i.e., that the two blocks between which the checkpoint is being taken is what the art considers as being "stable.". For two consecutive block to be characterized as "stable," sufficient time must have elapsed to guarantee that neither block will be contained in a fork. The principal difference between checkpointing a permissionless chain and a permissioned chain is that at the time the permissionless committers decide to create the checkpoint, they no longer have the world state (or ledger state) that existed after the first of the stable blocks and before the second of the stable blocks. Therefore, a step is inserted in the checkpoint process to reconstruct the ledger between the two stable blocks prior to writing the checkpoint data. As noted above, in a permissionless blockchain, those systems extending the chain do not normally communicate with one another; instead, whichever system solves the hard problem (e.g., hashing) problem first gets to extend the chain. In this context, the purpose of having the miners "agree" on where to take the checkpoint is so that the block containing the checkpoint will be committed sufficiently soon. The miners should also agree on the hash of the checkpoint. Both of these agreements, however, can be eliminated or changed as is now described.

In particular, the first agreement (on where to take the checkpoint) is replaced by an agreement between or among a subset of the miners. Similarly, the second agreement (on the hash of the checkpoint) preferably is then between or among those miners which agreed to take the checkpoint. In the permissionless embodiment, the information recorded with the hash then includes the location (e.g., the block) in the chain where the checkpoint was taken. Further, the hash of the agreed-upon world state must also be written into a new block. Of course, this hash cannot be written into the "next block," because that block is already stable. In the interest of maintaining the permissionless aspect of the blockchain, in this embodiment, all miners that have agreed to the checkpoint include the transaction with the hash of the checkpoint in all blocks they create until a block with the hash becomes stable.

Generalizing, according to this embodiment the checkpointing is carried out by a subset of the computing entities that are acting as the miners. A first consensus among the subset indicates consensus (among the subset) that a checkpoint between two stable blocks is to be taken. Instead of saving the world state associated with the blockchain (as in the permissioned embodiment), a world state associated with the first of the two stable blocks is recreated and then saved, and then the hash of the saved world state (associated with the first of the two stable blocks) is then generated. Further, a second consensus among the subset indicates consensus that each of them has generated the same hash, such that the same world state associated with the first of the two stable blocks has been saved (once again, by each of them). The saved world state associated with the first of the two stable blocks is then provided as a certified checkpoint for the permissionless blockchain.

In a variant, one system (miner) could take the checkpoint and then submit the checkpoint transaction to the blockchain repeatedly until it is seen that a block containing the checkpoint is stable. Any system can then verify the hash of the state of a stable block by running all transactions from the genesis block, or from the last checkpoint.

An agreed-upon checkpoint may be broadcasted to all miners to enable them to give it a priority for inclusion.

Certifying a checkpoint on a permissionless chain may be accomplished by having multiple miners recheck the hash and then sign-off that is it correct. Inserting consensus points as described above reduces the difficulty.

Figure 13A:
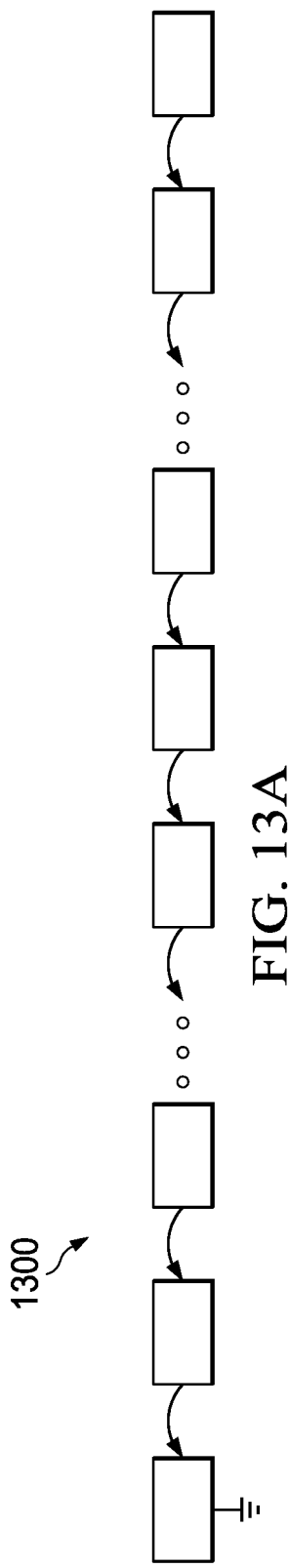
FIGS. 13A, 13B and 13C depict operations on a permissionless blockchain in an alternative embodiment.
Figure 13B:
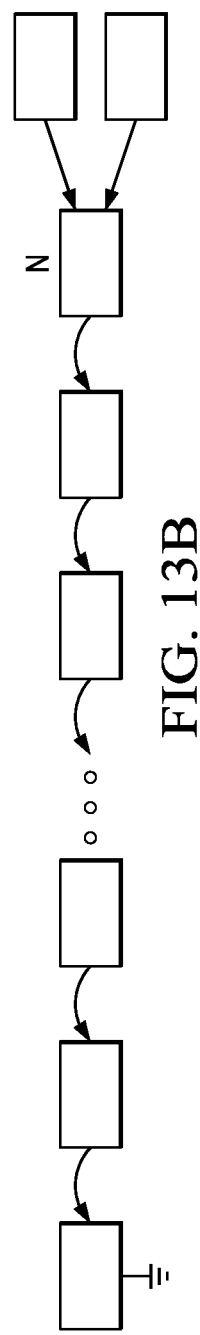
Figure 13C:
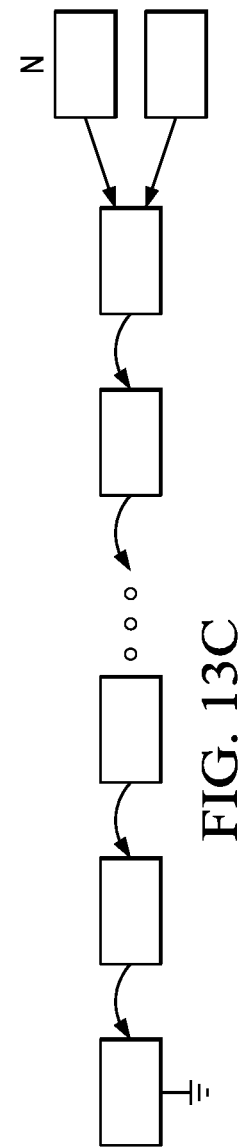

As an optimization, or alternative implementation, a sufficiently large subset of minors can decide to take a checkpoint at a future block, N, that is currently not stable. This eliminates the need to reconstruct state, but it adds some additional complexity. FIGS. 13A, 13B and 13C provide an overview of the basic issues. In particular FIG. 13A depicts a permissionless chain 1300, that has not reached block N. The definition of a sufficiently large subset of miners, represented by a value SLN, either is a configuration parameter, or it may be determined by any consensus method known to the art. The value defines the minimum number of miners required for a checkpoint. If less that SLN miners attempt a checkpoint, it is invalid and will be discarded. That group of miners agrees on a future block, N. FIGS. 13B and 13C are the two possibilities that could occur at block N. FIG. 13B illustrates that a fork of the chain could occur at the next block after N. This does not affect the checkpoint. The participating minors all have the same state, and they can record it (as previously described) and include it in the next block they commit. They would have to continue to include the checkpoint information in new blocks until a block containing it becomes stable. FIG. 13C illustrates that it is possible for a fork to occur at block N.

An implementer of this alternative embodiment also must decide how to handle a fork at block N. Properly-operating permissionless chains tune the hard problem that miners must solve to minimize the occurrences of forks. When forks occur, the longest chain rule determines which fork is legitimate. All transactions in the discarded fork that are not in the longest fork typically will need to be resubmitted, if so desired. The most straightforward way to solve this is to pick another block M greater than N at which to retry the checkpoint. A second way to resolve this is to allow the checkpoint to proceed, but run the consensus algorithm between the miners on the same fork. If the miners are all known, this second solution is reasonable. If all of the miners are not known, this solution is somewhat less desirable. One issue is that if a subset of miners is participating in the checkpoint, it is possible for them to all be on one fork when the other fork becomes the longest chain. In this case the checkpoint is discarded (by the longest chain rule), and the miners must pick M greater than N and try again. Similarly, the checkpoint must be discarded if SLN miners are not participating on the fork that becomes the longest chain.

The above-described approach to checkpointing for permissionless blockchains is advantageous because it does not rely on capabilities that are not necessarily found in permissionless blockchains, and it does not interrupt the system's ability to process transactions. As has been described, these advantages are provided by checkpointing at some stable block, and using an appropriate subset of miners.

In the technique described herein, a validating peer does not save the world state as a checkpoint until after it receives an indication that the validating peers (of which it is a member) have reached a first consensus on where the checkpoint will be done. In the context of a permissioned blockchain, the receipt of the indication may occur at any point in time before the next block is written.

The techniques herein provide for improvements to another technology or technical field, namely, peer-to-peer distributed networks, as well as improvements to the operational capabilities of such systems when used to provide shared public ledgers having permissioned visibility.

The techniques herein may be used in association with any type of peer-to-peer distributed network that uses cryptographic security, decentralized consensus, and a shared ledger (e.g., that has permissioned visibility).

Having described our invention, what we claim is as follows:

1. A method of checkpointing a permissionless blockchain in a peer-to-peer distributed network having a set of computing entities, comprising:
    at a computing entity, and upon receiving an indication that a first consensus among the set of computing entities has been reached, the first consensus indicating a consensus that a checkpoint between two stable blocks in the permissionless blockchain is to be taken, recreating and saving a world state associated with a first of the two stable blocks;
    at the computing entity, generating a compact representation of the saved world state associated with the first of the two stable blocks; and
    at the computing entity, upon receiving an indication that a second consensus among the set of computing entities has been reached, the second consensus indicating a consensus that each of the computing entities has generated the compact representation, thereby confirming that a same world state associated with the first of the two stable blocks has been saved by each of the computing entities, providing the saved world state associated with the first of the two stable blocks as a certified checkpoint for the permissionless blockchain.

2. The method as described in claim 1 wherein the compact representation is a hash.

3. The method as described in claim 2 further including saving the hash as a transaction in a block of the blockchain, and continuing to record the hash in additional blocks of the blockchain until a block containing the hash becomes stable.

4. The method as described in claim 1 wherein the world state associated with the first of the two stable blocks is saved in a separate blockchain.

5. The method as described in claim 1 wherein after the first consensus is reached by a subset of the computing entities writing the blocks to the permissionless blockchain.

6. The method as described in claim 1 wherein the world state associated with the first of the two stable blocks is one of: a full world state, a delta world state, and a mix of the full world state and the delta world state.

7. The method as described in claim 1 further including certifying the checkpoint.

8. An apparatus, comprising:
    a processor; and
    computer memory holding computer program instructions executed by the processor and configured to checkpoint a permissionless blockchain in a peer-to-peer distributed network having a set of computing entities, the computer program instructions comprising:
        program code configured upon receiving an indication that a first consensus among the set of computing entities has been reached, the first consensus indicating a consensus that a checkpoint between two stable blocks of the permissionless blockchain is to be taken, to recreate and save a world state associated with a first of the two stable blocks;

program code configured to generate a compact representation of the saved world state associated with the first of the two stable blocks; and program code configured to provide the saved world state as a certified checkpoint for the permissionless blockchain upon receiving an indication that a second consensus among the set of computing entities has been reached, the second consensus indicating a consensus that each of the computing entities has generated the compact representation, thereby confirming that a same world state associated with the first of the two stable blocks has been saved by each of the computing entities.

9. The apparatus as described in claim 8 wherein the compact representation is a hash.

10. The apparatus as described in claim 8 further including program code configured to save the hash as a transaction in a block of the blockchain, and continuing to record the hash in additional blocks of the blockchain until a block containing the hash becomes stable.

11. The apparatus as described in claim 8 wherein the world state associated with the first of the two stable blocks is saved in a separate blockchain.

12. The apparatus as described in claim 8 wherein the first consensus is reached by a subset of the computing entities writing the blocks to the permissionless blockchain.

13. The apparatus as described in claim 8 wherein the world state associated with the first of the two stable blocks is one of: a full world state, a delta world state, and a mix of the full world state and the delta world state.

14. The apparatus as described in claim 8 further including program code to certify the checkpoint.

15. A computer program product in a non-transitory computer readable medium for use in a data processing system, the computer program product holding computer program instructions which, when executed by the data processing system, are operative to checkpoint a permissionless blockchain in a peer-to-peer distributed network having a set of computing entities, the computer program instructions comprising:

program code configured upon receiving an indication that a first consensus among the set of computing entities has been reached, the first consensus indicating a consensus that a checkpoint between two stable blocks of the permissionless blockchain is to be taken, to recreate and save a world state associated with a first of the two stable blocks;

program code configured to generate a compact representation of the saved world state associated with the first of the two stable blocks; and program code configured to provide the saved world state as a certified checkpoint for the permissionless blockchain upon receiving an indication that a second consensus among the set of computing entities has been reached, the second consensus indicating a consensus that each of the computing entities has generated the compact representation, thereby confirming that a same world state associated with the first of the two stable blocks has been saved by each of the computing entities.

16. The computer program product as described in claim 15 wherein the compact representation is a hash.

17. The computer program product as described in claim 15 further including program code configured to save the hash as a transaction in a block of the blockchain, and continuing to record the hash in additional blocks of the blockchain until a block containing the hash becomes stable.

18. The computer program product as described in claim 15 wherein the world state associated with the first of the two stable blocks is saved in a separate blockchain.

19. The computer program product as described in claim 15 wherein the first consensus is reached by a subset of the computing entities writing the blocks to the permissionless blockchain.

20. The computer program product as described in claim 15 wherein the world state is one of: a full world state, a delta world state, and a mix of the full world state and the delta world state.

21. The computer program product as described in claim 15 further including program code to ceritfy the checkpoint.

* * * * *